United States Patent
Hamann et al.

(10) Patent No.: US 8,481,644 B2
(45) Date of Patent: Jul. 9, 2013

(54) LOW CHLORIDE POLYBUTADIENE

(75) Inventors: Evemarie Hamann, Halle (DE); Vera Steinert, Oppin (DE); Norbert Jantsch, Halle (DE)

(73) Assignee: Styron Europe GmbH, Horgen (CH)

( * ) Notice: Subject to any disclaimer, the term of this patent is extended or adjusted under 35 U.S.C. 154(b) by 21 days.

(21) Appl. No.: 12/999,257

(22) PCT Filed: Jun. 2, 2009

(86) PCT No.: PCT/US2009/045895
§ 371 (c)(1),
(2), (4) Date: Dec. 15, 2010

(87) PCT Pub. No.: WO2009/155126
PCT Pub. Date: Dec. 23, 2009

(65) Prior Publication Data
US 2011/0092646 A1    Apr. 21, 2011

Related U.S. Application Data

(60) Provisional application No. 61/073,625, filed on Jun. 18, 2008.

(51) Int. Cl.
*C08C 19/34* (2006.01)
*C08F 236/06* (2006.01)
*C08F 279/02* (2006.01)
*C08L 55/02* (2006.01)
*C08L 15/00* (2006.01)

(52) U.S. Cl.
USPC ................................ 525/71; 525/89; 525/98

(58) Field of Classification Search
USPC ............................... 525/71, 89, 98
See application file for complete search history.

(56) References Cited

U.S. PATENT DOCUMENTS

| | | | |
|---|---|---|---|
| 4,311,803 A | | 1/1982 | Smith et al. |
| 4,914,248 A | * | 4/1990 | Kitagawa et al. ............. 525/113 |
| 5,552,493 A | | 9/1996 | Spence et al. |
| 6,410,654 B1 | * | 6/2002 | Desbois et al. ............... 525/316 |
| 6,593,430 B1 | * | 7/2003 | Knoll et al. .................... 525/314 |
| 6,635,713 B1 | | 10/2003 | Kondou et al. |
| 2010/0137520 A1 | * | 6/2010 | Robertson et al. ............ 525/236 |

FOREIGN PATENT DOCUMENTS

| | | |
|---|---|---|
| CN | 1934210 A | 3/2007 |
| EP | 0 019 100 A1 | 11/1980 |
| EP | 1 197 516 A1 | 4/2002 |
| EP | 1 217 009 A1 | 6/2002 |
| EP | 1 566 423 A1 | 8/2005 |
| JP | 51007696 | 3/1976 |
| JP | 7-2958 | 1/1995 |
| JP | 07002958 | 1/1995 |
| JP | 10-25313 * | 1/1998 |
| JP | 10025313 | 1/1998 |
| JP | 2001/089543 | 4/2001 |
| JP | 2004-18795 A | 1/2004 |
| WO | WO 00/73381 A1 | 12/2000 |
| WO | WO 01/70821 A1 | 9/2001 |
| WO | WO 2005/080523 A1 | 9/2005 |

OTHER PUBLICATIONS

Matsuda, electronic translation of the specification of JP 70-02958 (Jan. 1995).*
Yamazaki et al., partial electronic translation of JP 10-25313 (Jan. 1998).*
PCT Search Report mailed Jul. 13, 2009 for corresponding PCT Application No. PCT/US2009/045895.
Chinese Office Action dated May 9, 2012, Chinese Application No. 200980123074.1, pp. 1-13, State Intellectual Property Office of the People's Republic of China, Beijing, China.

* cited by examiner

*Primary Examiner* — Jeffrey Mullis
(74) *Attorney, Agent, or Firm* — Brinks Hofer Gilson & Lione

(57) ABSTRACT

Compositions comprising a coupled interpolymer such as polybutadiene which may be suitable for HIPS and ABS have been discovered. The coupled interpolymer composition comprises an interpolymer comprising one or more monomeric units derived from a diene wherein the coupled interpolymer composition is characterized by: (A) a halide content of less than about 30 ppm based on the total weight of the coupled interpolymer; (B) a molecular weight distribution of from about 1.6 to about 2.4; and (C) a vinyl content of from about 5 to about 15 weight percent based on the total weight of the coupled interpolymer.

18 Claims, 2 Drawing Sheets

LOW CHLORIDE POLYBUTADIENE

This application is a National Stage of International Application PCT/US2009/045895 filed Jun. 2, 2009, which claims the benefit of the filing date under 35 U.S.C. §119(e) of Provisional U.S. Patent Application Ser. No. 61/073,625, filed Jun. 18, 2008. The entirety of both applications is hereby incorporated by reference.

FIELD OF THE INVENTION

This invention relates to an improved coupled interpolymer composition and process wherein said interpolymers may be useful in, for example, high impact polystyrene and acrylonitrile butadiene styrene polymers.

BACKGROUND AND SUMMARY OF THE INVENTION

Coupled polybutadiene is often desired as an additive or to make other polymeric systems such as, for example, high impact polystyrene (HIPS) or acrylonitrile butadiene styrene (ABS) polymers. Typical processes for making such coupled polybutadiene usually involve the use of a halide-containing compound. For example, as described in WO2001/70821, multihalide coupling agents such as a silicon, tin, lead, or germanium multihalide are employed. EP 0019100 describes the use of a gel inhibitor which includes hydrocarbyl halides and silicon halides, as well as, the use of multihalide coupling agents. Unfortunately, the use of such multihalide coupling agents or halide-containing gel inhibitors often results in a coupled polybutadiene which contains residual halide ions. Such halide ions, particularly chloride ions, may facilitate corrosion in the reactors, tanks, and recovery equipment used to produce the coupled polybutadiene and/or any further polymeric systems. In addition, the resulting coupled polybutadiene may also comprise high levels of gels which further contribute to equipment corrosion and/or fouling.

Various approaches have been attempted to reduce or eliminate the equipment corrosion and fouling problems. For example, special steel and protective coatings have been used as described in JP 51007696. Also, basic additives have been employed as described in EP 1217009 and JP10025313. Unfortunately, such approaches are not cost-efficient as they involve more expensive equipment or additives.

Other ways of producing coupled polybutadiene that do not involve the use of a multihalide coupling agent or halide-containing gel inhibitor have also proven problematic. For example, WO2000/073381, JP2001/089543, and JP07002958 employ non-halide coupling agents. Unfortunately, WO2000/073381 and JP2001/089543 each produce a coupled polybutadiene with a high vinyl content (30-60% in the case of WO2000/073381 and 50% in the case of JP2001/089543) while JP07002958 produces a coupled polymer that has three specified molecular weights.

Accordingly, it would be desirable to discover an improved coupled interpolmer such as coupled polybutadiene and process for producing it and subsequent polymers made therefrom which lessened the problem of equipment corrosion and/or fouling. It would further be desirable if such coupled interpolymer composition and process was cost-efficient and produced a coupled interpolymer with a lower vinyl content and more acceptable molecular weight distribution than the processes described above. It would further be desirable if such an improved coupled interpolymer could be useful in making such items as high impact polystyrene and acrylonitrile butadiene styrene.

Advantageously, compositions and processes have been discovered that meet many of the aforementioned needs and also have other desirable characteristics. In one embodiment, the inventive composition is a coupled interpolymer comprising one or more monomeric units derived from a diene wherein the coupled interpolymer is characterized by: a halide content of less than about 30 ppm based on the total weight of the coupled interpolymer; a molecular weight distribution of from about 1.6 to about 2.4; and a vinyl content of from about 5 to about 15 weight percent based on the total weight of the coupled interpolymer. In another embodiment, the coupled interpolymer is coupled polybutadiene, preferably low-cis coupled polybutadiene.

In another embodiment, the inventive process for preparing a coupled interpolymer composition comprising one or more monomeric units derived from a diene comprises polymerizing a diene monomer in the presence of an initiator to form an interpolymer and coupling said interpolymer in the presence of a tetraalkoxysilane. This produces a coupled interpolymer. The coupled interpolymer is often characterized by: a halide content of less than about 30 ppm based on the total weight of the coupled interpolymer; a molecular weight distribution of from about 1.6 to about 2.4; and a vinyl content of from about 5 to about 15 weight percent based on the total weight of the coupled interpolymer. Advantageously, in one embodiment the process may be conducted in the substantial absence of halide-containing compounds.

In other embodiments, the invention pertains to a high impact polystyrene or an acrylonitrile butadiene styrene polymer. Each may be derived from the aforementioned coupled interpolymer such as coupled polybutadiene or more preferably coupled low-cis polybutadiene.

DETAILED DESCRIPTION OF THE INVENTION

General Definitions

Figure 1:
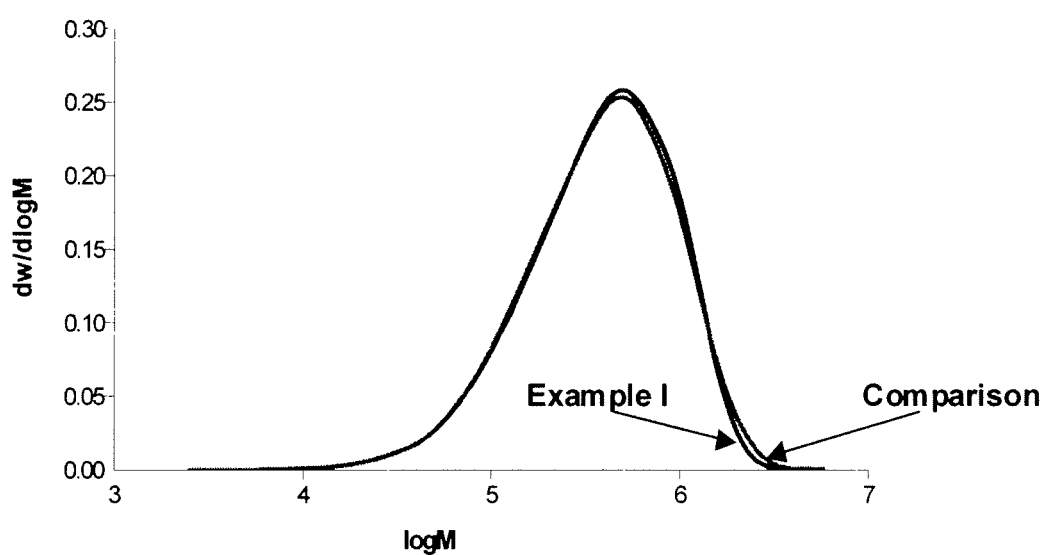
FIG. 1 shows the dw/d log M plotted against log M for Example I and the Comparative Example.

"Polymer" or "interpolymer" means a polymeric compound prepared by polymerizing monomers, whether of the same or a different type. The generic term "polymer" or "interpolymer" embraces the terms "homopolymer," "copolymer," "terpolymer" as well as polymers made by polymerizing four or more types of monomers.

"Coupled interpolymer" is an interpolymer made by employing a coupling agent.

"Composition," as used herein, includes a mixture of materials which comprise the composition, as well as reaction products and decomposition products formed or derived from the ingredients or materials of the composition. Specifically included within the compositions of the present invention are grafted or coupled compositions wherein an initiator or coupling agent reacts with at least a portion of one or more coupled polybutadiene polymers.

"Halogen" includes fluorine, chloride, bromine, and iodine.

Coupled Interpolymer Composition

The compositions of the present invention comprise a coupled interpolymer wherein the coupled interpolymer comprises one or more monomeric units derived from a diene. Suitable dienes from which the monomeric units are derived are described further below but in one embodiment are preferably butadiene, more preferably 1,3 butadiene. In this manner, in one embodiment a coupled polybutadiene, preferably low cis coupled polybutadiene, may be formed.

The coupled polydiene, preferably polybutadiene, may be in any suitable bonding configuration. For example, it may include from 0 to 100 percent of the various polybutadiene double bond addition configurations of 1,4 cis; 1,4 trans; and 1,2. In a preferred embodiment the coupled polybutadiene is a low-cis polybutadiene. This means that often less than about 90, preferably less than about 70 mole percent of the double bonds in the finished polybutadiene are in the 1,4 cis bonding connected formation. In another embodiment, the polybutadiene is characterized by a composition of the 1,4-bondings of from about 35 to about 70 mole percent cis-bondings and from about 30 to about 65 mole percent trans-bondings based on the total double bonds in the finished polybutadiene. In yet another embodiment, the polybutadiene is characterized by a composition of the 1,2-bondings of from about 5 to about 15 mole percent and a composition of the 1,4-bondings of from about 85 to about 95 mole percent based on the total double bonds in the finished polybutadiene.

The coupled interpolymer compositions, for example, coupled polybutadiene, of the present invention may in one embodiment often be characterized by a halide content of less than about 30, preferably less than about 20, more preferably less than about 10 ppm, most preferably less than about 5 ppm based on the total weight of the coupled interpolymer. In another embodiment the coupled interpolymer such as coupled polybutadiene may be characterized by a molecular weight distribution of from about 1.6 to about 2.4. In another embodiment the coupled interpolymer such as coupled polybutadiene may be characterized by a total vinyl content of from about 5 to about 15, preferably of from about 8 to about 10 weight percent based on total weight as measured by 1H NMR. In another embodiment, the coupled interpolymer compositions, for example, coupled polybutadiene, is characterized by each of the aforementioned halide content, molecular weight distribution, and total vinyl content.

The Mooney viscosity, solution viscosity, and Mz+1 of the coupled polybutadiene may vary depending upon the starting materials, the desired properties, and the process employed. However, typically, the Mooney viscosity ML1+4 of the coupled polybutadiene is from about 40 to about 80, preferably from about 45 to about 70, more preferably from about 50 to about 65 Mooney units MU. The solution viscosity of a 5% solution in styrene is typically from about 100 to about 200, preferably from about 140 to about 170 mPas measured at a temperature of 25° C. The Mz+1 (calculated based upon polystyrene standards) of the coupled polybutadiene is often from about 1000 to about 1300, preferably from about 1040 to about 1250 kg/mol.

As recognized by the skilled artisan, a variety of various modifiers, stabilizers, and antioxidants may be employed with the aforementioned coupled polybutadiene.

Figure 2:
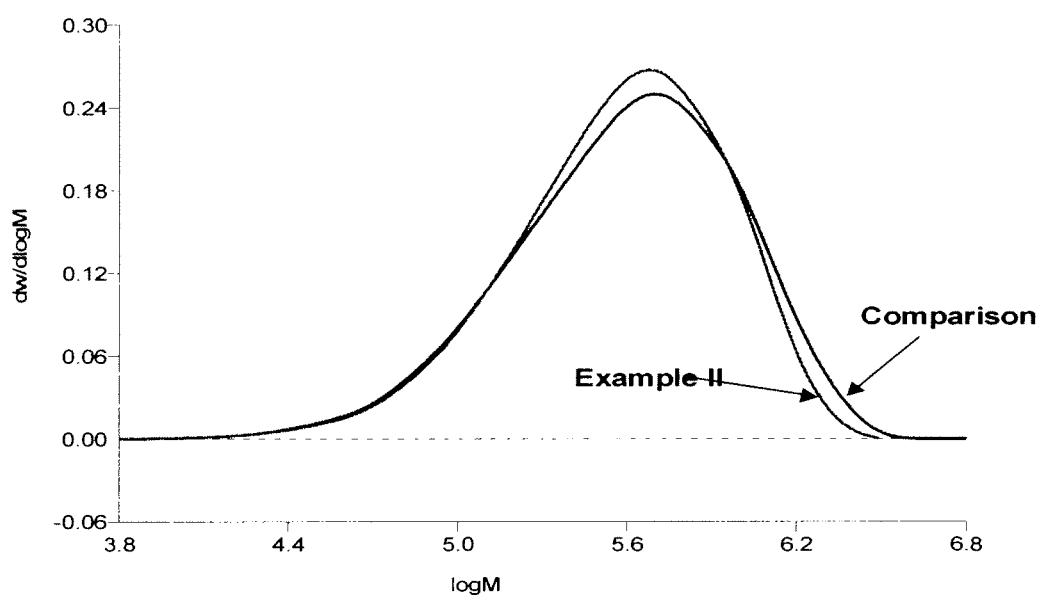
FIG. 2 shows the dw/d log M plotted against log M for Example II and the Comparative Example.

While not wishing to be bound to any particular theory, it is believed that the aforementioned compositions lessen the problem of equipment corrosion and/or fouling for a number of reasons. First, the low amounts of halogen prevent the formations of acids such as HCl, as well as, chloride salts. However, it has also been discovered that the inventive compositions often comprise a significantly lower amount of high molecular rubber as shown in FIGS. 1-2 and also significantly lower gel content. These low amounts of high molecular weight residues and/or gel are believed to contribute to assist in controlling undesired corrosion and/or fouling.

Process for Making Coupled Interpolymer Compositions

The inventive process for making the coupled interpolymer compositions generally comprises first polymerizing a suitable diene monomer, for example 1-3 butadiene, in the presence of an initiator and, if desired, a solvent to form an interpolymer, for example, polybutadiene. Next, the interpolymer such as polybutadiene is coupled in the presence of a tetraalkoxysilane to produce a coupled interpolymer such as coupled polybutadiene which is often characterized by a halide content of less than about 30 ppm based on total weight of coupled interpolymer, a molecular weight distribution of from about 1.6 to about 2.4, and a vinyl content of from about 5 to about 15 weight percent based on total weight of coupled interpolymer. The process may be conducted continuously or batch-wise. Preferably, the process is conducted in the substantial absence of halide-containing compounds, i.e., the amount of any compound that is capable of leaving halide in the coupled interpolymer is such that any resulting coupled interpolymer such as coupled polybutadiene often has a halide content of less than about 30 ppm based on total weight of coupled interpolymer.

Polymerizing Step

For illustrative purposes the instant process is described in regard to producing coupled polybutadiene from, for example, a 1,3-butadiene. However, other polydienes may be prepared in a similar manner. Accordingly, useful feedstocks may include one or more conjugated diolefin monomers. Preferred diene monomers utilized in the preparation of the linear polydiene chains normally contain from 4 to 12 carbon atoms, with those containing from 4 to 8 carbon atoms being most commonly used. Isoprene and 1,3-butadiene are common conjugated diolefin monomers and may be used in this process. Additional monomers that can be utilized include 1,3-pentadiene, 2-methyl-1,3-pentadiene, 4-butyl-1,3-pentadiene, 1,3-hexadiene, 1,3-octadiene, 2,3-dimethyl-1,3-butadiene, piperylene, 2,3-dibutyl-1,3-pentadiene, 2-ethyl-1,3-pentadiene, 2-ethyl-1,3-butadiene, 3-butyl-1,3-octadiene, 2-phenyl-1,3-butadiene, styrene and the like, alone or in combinations thereof. If desired the feedstock may comprise an admixture of the conjugated diolefin, e.g. 1,3-butadiene, with other low molecular weight hydrocarbons. Such admixtures, termed low concentration diene streams, are often obtainable from a variety of refinery product streams, such as naptha-cracking operations.

Coupled interpolymers which are often copolymers or terpolymers of diolefin monomers with one or more other ethylenically unsaturated monomers can also be prepared using the process of this invention. Some representative examples of ethylenically unsaturated monomers that can potentially be synthesized into such polymers include vinylidene monomers; vinyl aromatics such as styrene, .alpha-methylstyrene, bromostyrene, chlorostyrene, fluorostyrene and the like; .alpha.-olefins such as ethylene, propylene, 1-butene, and the like; vinyl halides, such as vinylbromide, chloroethane (vinylchloride), vinylfluoride, vinyliodide, 1,2-dibromethene, 1,1-dichloroethane (vinylidene chloride), 1,2-dichloroethane, and the like; vinyl esters, such as vinyl acetate; .alpha.-olefinically unsaturated nitriles, beta.-olefinically unsaturated nitriles, such as acrylonitrile anides, such as (meth) acrylamide, N-methyl acrylamide, N,N-dimethylacrylamide, methacrylamide and the like.

The polymerization is typically conducted in the presence of a suitable organic solvent and a suitable initiator. Suitable solvents may vary depending upon any other reactants and process conditions. In general, organic solvents are hydrocarbons such as one or more aromatic, paraffinic, cycloparaffinic compounds or any mixture thereof. The solvents normally contain from 4 to 10 carbon atoms per molecule and are liquids under the polymerization conditions. Some representative examples of potentially useful organic solvents include pentane, cyclohexane, normal hexane, heptane, benzene, toluene, xylene, ethyl benzene, and the like, alone or in admixture.

The organic solvent is preferably selected from the group consisting of a cycloalkane, an alkane, or a mixture thereof. A particularly preferable solvent medium comprises at least about 60% by weight cyclohexane. More preferably, the organic solvent comprises cyclohexane and up to about 40% by weight of a branched or straight chain alkane having from about 3 to about 5 carbon atoms.

Suitable initiators may vary depending upon any other reactants and process conditions. Typical initiators are selected from organometallic compounds of the general formula MRx wherein M is Group 1 or Group II metal and R is an organic group described herein below. Organometallic initiators include the monofunctional and multifunctional types known for polymerizing the monomers described herein. Generally, utilization of a monofunctional organometallic initiator may be preferable. Preferred metals include lithium, potassium, sodium, zinc, magnesium, and aluminum. Of these, the organolithium initiators are particularly preferred.

The term "organolithium compounds", as employed herein, refers to organolithium compounds which correspond to the formula RLi, wherein R is a C1-C20 hydrocarbyl radical, preferably C3-C6, advantageously an aliphatic radical, but also may be C6-C20 cycloaliphatic or aromatic, preferably C6-C12. Preferred RLi compounds are n-butyl and sec-butyl lithium. Other suitable RLi compounds include but are not restricted to those in which the R groups are ethyl, n-propyl, isopropyl, n-arnyl, sec-amyl, sec-hexyl, n-hexyl, n-heptyl, octyl, nonyl, decyl, dodecyl, octadecyl, phenyl, tolyl, dimethyl/phenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methycyclopentylethyl, phenylethyl, cyclopentadienyl, naphthyl, penylcyclohexyl, and the like.

The amount of organometallic initiator utilized can vary with the initiator, the monomers being polymerized, the molecular weight desired for the resultant polymer, and with the reaction conditions. Generally, from about 0.03 to about 0.15 phm (parts per 100 pbw of monomer) of initiator may be useful while from about 0.06 to about 0.095 phm is preferred and from about 0.07 to about 0.08 phm is more preferred.

The polymerization medium preferably contained from about 15 to about 30, preferably from about 20 to about 27 weight percent monomer based on the weight of monomer and solvent(s). The polymerization medium also may include a suitable amount of a chain transfer agent such as 1,2-butadiene. Suitable amounts of chain transfer agent vary but are often preferably from about 0.3 to about 1.2 phm, more preferably from about 0.45 to about 1 phm based on the total weight of monomer.

The polymerization temperature and time can vary over a broad range depending upon the reactants and reaction conditions. Generally, the temperature may range from about −20 to about 150, preferably from about 30 to about 120, more preferably from about 70 to about 100, and even more preferably from about 75 to about 95° C. The pressure employed will normally be sufficient to maintain a substantially liquid phase under the polymerization conditions.

Similarly, the polymerization reaction time should be sufficient to obtain the desired conversion which may be at least about 90%, preferably at least about 99%, more preferably at least about 99.5% conversion. That is, the polymerization is often preferably carried out until at least 90% of the charged monomer has been polymerized. The amount of time thus may at least partially depend upon the temperature. Accordingly, using the above described preferred temperatures, typical reaction times may range from about 30 to about 100, preferably from about 40 to about 80 minutes.

In one embodiment, at the end of the polymerization step the reaction product preferably may be characterized by a molecular weight, $M_n$, of about 140 to about 180 kg/mol, an $M_w$ of about 270 to about 350 kg/mol, wherein each of the aforementioned parameters are measured according to polystyrene standards available from Polymer Laboratories and/or a Mooney viscosity ML1+4 (100° C.) in the range of about 10 to about 25 MU.

Coupling Step

The coupling step is preferably conducted in a second, separate reactor which is connected in series with the polymerization reactor. In such a case, the tetraalkoxysilane coupling agent is preferably added to the interpolymer, e.g., polybutadiene, at or near an outlet of the polymerization reactor.

The multifunctional coupling agent preferably joins at least three polydiene chains. Suitable coupling agents include, for example, tetraalkoxysilane coupling agents. Preferably, each alkoxy group is a C1-C4 alkoxy group such as methoxy, ethoxy, n-propoxy, i-propoxy, n-butoxy, i-butoxy, t-butoxy. Each of the four alkoxy groups may be the same or different with the proviso that preferably all four alkoxy groups are not ethoxy. A particularly preferable tetraalkoxysilane coupling agent is tetramethoxysilane.

The coupling agent is typically dissolved in a suitable organic solvent such as those described above in regard to the polymerization step. A particularly preferable solvent is cyclohexane. The amount of coupling agent employed is often based on the amount of initiator employed. Typically, the ratio of coupling agent to initiator is preferably from about 0.1 to about 0.21, more preferably from about 0.13 to about 0.18 on a molar basis.

The coupling reaction temperature and time can vary over a broad range depending upon the reactants and reaction conditions. Typically, the coupling is conducted for a time of from about 70 to about 200% of the time that the polymerization is conducted. Advantageously, the coupling is generally conducted at about the same or lower temperature than the polymerization. In one embodiment, the coupling is often conducted at a temperature of from about 70 to about 100, preferably at a temperature of from about 75 to about 90° C. In another embodiment, the coupling is conducted for a time of from about 35 to about 100, preferably from about 40 to about 80 minutes. In another embodiment the coupling is conducted at a temperature of from about 70 to about 100, preferably at a temperature of from about 75 to about 90° C. for a time of from about 35 to about 100, preferably from about 40 to about 80 minutes.

The reaction can be terminated, i.e., stopped, by any known method. Typically, convenient methods include the addition of water, lower alcohols, etc to the coupling medium. Preferably, a stopping agent such as methanol, is added at or near an outlet of the coupling reactor.

The solvent is removed by common methods as steam stripping or direct evaporation and the resulting polymer dried by the usual drying methods.

HIPS and ABS

The resultant coupled interpolymer is particularly suited for use in the manufacture of HIPS and ABS resins due to, for example, the molecular weight and viscosity ranges. That is, high impact polystyrene (HIPS) may be made that comprises from about 3 to about 15 weight percent of its total weight based on units derived from the coupled interpolymer, e.g., coupled polybutadiene may be made. The high impact polystyrene may be made by making the coupled interpolymer by the process described above and then polymerizing styrene in the presence of a suitable amount of said coupled interpolymer, preferably coupled polybutadiene, more preferably low cis coupled polybutadiene. Suitable amounts vary depending upon the desired properties but usually the styrene may be polymerized in the presence of from about 3 to about 15 weight percent of a dissolved, coupled low-cis polybutadiene based on total weight of styrene and coupled interpolymer. Other polymers may be included in the HIPS including, for example, linear polybutadiene, branched polybutadiene, star branched polybutadiene, high cis-polybutadiene, a block or diblock copolymers or a mixture thereof.

Similarly, acrylonitrile butadiene styrene (ABS) may be made that comprises from about 2 to about 20 weight percent of its total weight based on units derived from the coupled interpolymer, e.g., coupled polybutadiene. As in HIPS, the ABS may be made by first making a coupled interpolymer such as low-cis polybutadiene by the process described above and then polymerizing styrene and acrylonitrile in the presence of a suitable amount of said coupled interpolymer. Suitable amounts vary depending upon the desired properties but usually the ingredients are polymerized in the presence of from about 2 to about 20 weight percent of the coupled interpolymer based on total weight. Other polymers may be included in the ABS including, for example, linear polybutadiene, branched polybutadiene, star branched polybutadiene, high cis-polybutadiene, a block or diblock copolymers or a mixture thereof.

In both HIPS and ABS grafting of polybutadiene may occur. Toughness, as well as other mechanical and rheological properties of the resulting product, is often affected by the nature of the coupled interpolymer. In this regard, some of the characteristics of the coupled interpolymer which may be modified to control the overall performance include concentration, volume, particle size, grafting and cross-linking ability, molecular weight, and viscosity. In a preferred embodiment, HIPS and/or ABS made from the coupled interpolymer, e.g., coupled polybutadiene, produced in the present invention advantageously comprise less than about 10, preferably less than about 6 ppm halide content based on total weight of HIPS and/or ABS. In another embodiment, HIPS and/or ABS made from the coupled interpolymer, e.g., coupled polybutadiene, produced in the present invention advantageously comprise low gels.

According to the need, ingredients conventionally used in the resin industry can be incorporated in the polymers of the present invention. As specific examples of the ingredients, there can be mentioned mineral oil and fluid paraffin. If a monomer for a resin is polymerized in the presence of the polybutadiene to produce a resin composition, ingredients used should preferably be selected from those which do not significantly deteriorate the polymerization reaction or properties of the resulting composition.

While certain representative embodiments and details have been shown for purposes of illustrating the present invention, various modifications and changes to the process can be made without departing from the scope of the present invention.

EXAMPLES

The Examples provided are intended to assist in an understanding of the invention, and are directed to those of skill in the art. Particular species employed, particular conditions, relationships, and the like, are designed to be illustrative, and not limiting. All designations of "part" or "parts" and "%" as will be used in the following examples mean part or parts by weight and wt. % unless expressly noted.

Measurements were conducted in accordance with methods described below.

Weight average molecular weight (Mw), number average molecular weight (Mn) and the molecular weight distribution (Mw/Mn) of the polymer were each measured using Size Exclusion Chromatography SEC based on polystyrene standards. Each polymer sample (9-11 mg) was dissolved in 10 ml unstabilized tetrahydrofurane to form a solution. The solution was filtered using a 0.45 μm filter. A 100 μl sample was fed into a GPC from Hewlett Packard system 1100 with 3 PLgel 10 μm MIXED-B columns using a flow rate of 1 ml/min. Refraction Index-detection was used as detector for analyzing the molecular weight. The molecular weight was calculated as polystyrene, based on the calibration with monodisperse EasiCal PSI (Easy A and B) Polystyrene standards in the range of 0.58 to 7500 kg/mol from Polymer Laboratories.

The Mooney viscosity ML+4 was measured in accordance with ASTM 1646 (2004), by using a viscometer MV 2000 E, from Alpha-Technologies. The test sample was warmed up for exactly 1 minute at 100° C. in the closed cavity of the viscometer. The motor which drives the rotor was then run for 4 minutes. The viscosity value was determined by the torque in Mooney units (ML1+4).

Solution viscosity was determined using automated equipment AVS 350, Fa. Schott with a standard Ubbelohde capillary type III at 25° C. 7+/−0.001 g rubber are dissolved for at least 4 hours in 133+/−0.1 g styrene until complete dissolution. The required amount of the solution is filled into the capillary of the viscometer and tempered for 15 minutes. The time for passing the marked lines is then measured automatically and the solution viscosity (dynamic viscosity) in mPas is also calculated automatically using the following formula: dynamic visccosity: $\eta=K*t_k*d$, where K is the constant of the used capillary in $mm^2/s^2$, $t_k$ is the passing time in s, d is the density of the solution in $g/cm^3$.

Vinyl content was measured using 1H-NMR, following ISO 21561-2005, using a NMR spectrometer BRUKER Avance 200, and a 5 mm Dual probe. The $CDCl_3$/TMS was used as solvent in a weight ratio of 0.05%:99.95%.

Gel in the composition was measured by counting colored gel particles differentiated according their diameter. First, 20 g of the composition was cut into cubes of 4-6 mm in length. The cubes were then dissolved in 700 ml xylene for at least 6 hours until there was complete dissolution. The solution was then sieved through a Whatman filter paper number 2. The filter paper was carefully colored with a SUDAN III solution in xylene (concentration 1 g/l). After evaporation of the solvent the colored numbers of gel particles were measured and counted with regard to their longest diameter.

The chloride content of the composition was measured by first dissolving 1 g of the composition in 100 ml Xylene for 24 hours at ambient temperature. The chloride was extracted by shaking the xylene solution twice with 35 ml water each time. Both aqueous phases were transferred into a 100 ml graduated flask and filled up to 100 ml with water. The chloride content in the water was determined using an ion chromatography system from Metrohm comprising a pump 709, Metrohm Suppressor-Modul 753, conductivity detector 732, IC Separation Center 733 and Metrohm IC Sample Processor 766. The separation column used, was IonPac™ AS12A 4 mm P/N 46034 from Dionix Corporation.

Example I

Two 5-liter stainless steel reaction vessels equipped with a stirrer and a jacket as well as with a computer-aided processing system were connected in series. A continuous anionic solution polymerization was conducted under anaerobic conditions in the following manner:

Into the first stirred reactor were continuously charged by means of pumps 2479 g/h cyclohexane, 427 g/h 1,3-butadiene, 0.152 g/h 1,2-butadiene as 4% solution in cyclohexane and 19.9 g n-BuLi as a cyclohexane solution of 0.2359 mol/kg from respective reservoirs. These reagents had been purified, prior to use, by individually appropriate techniques known to the art, such as alumina beds, mole sieves, distillation, and the like. The temperature of the reactor was controlled to be 85° C.

After the polymerization step which lasted 75 minutes, the interpolymer was transferred from the bottom outlet of the polymerization reactor via stainless steel pipe to the top of a stirred coupling reactor. As the polymerization reaction mixture passed from the polymerization reactor to the coupling reactor in series, polymerization was substantially complete. The process was operated in such a manner that the time for polymerization was sufficient to permit substantially complete polymerization by this stage. In the coupling reactor the polymerization admixture was reacted with the coupling agent. The coupling agent tetramethoxysilane was continuously added in a ratio of 0.148 mol/mol BuLi to the reaction mixture at the top of the coupling reactor to effect the coupling reaction. The temperature of the coupling reactor was also controlled to be 85° C. The residence time in the polymerization reactor was 75 minutes and the residence time in the coupling reactor was 73 minutes.

A methanol stopping agent and a stabilizer were added at the outlet of the coupling reactor. Desolvating and drying followed.

Example II

The equipment employed comprised a reactor train consisting of a stirred pot reactor, equipped with an overhead condenser and a jacket-cooling-heating-system, and a stirred coupling. The two reactors were connected in series via stainless steel tubes and valves and a coagulation and finishing section. Cyclohexane, n-butane and 1,3-butadiene were purified, prior to use. A total solvent (17864 kg/h) consisted of 25 wt. % n-butane and 75 wt. % cyclohexane, 1,3-Butadiene (4466 kg/h), 1,2-Butadiene (2 kg/h) and n-Butyllithium (3.48 kg/h) as a cyclohexane solution were continuously charged into the first reactor. The process was operated such that the time for polymerization was sufficient to permit substantially complete polymerization. Into the outlet of the first reactor a coupling agent comprising tetramethoxysilane in cyclohexane solution (0.135 mol tetramethoxysilane per mol Butyllithium) was continuously added to effect the coupling reaction in the second reactor. Solvent-mix (3000 kg/h) was continuously charged into the coupling reactor via nozzles to prevent interpolymer cement residues from sticking to the walls.

The reaction temperature in both reactors was controlled to be 85° C. The residence time in the polymerization reactor was 72 minutes and the residence time in the coupling reactor was 62 minutes.

A methanol stopping agent and antioxidants were added to the reaction mixture at the outlet of the second reactor. The polymer cement, having stabilizer incorporated therein, was then recovered by coagulation and finishing.

Comparative Example

A polybutadiene was produced similarly to Examples I and II except that a silicon tetrachloride ($SiCL_4$) coupling agent was employed as described in WO 01/70821 A1.

Results

Analysis results for Examples I, II and Comparative are shown in Table 1 below. No chloride was detected in the example according our invention versus 79 ppm in the comparative example. The number of visible gel particles is also reduced.

TABLE 1

|  | Unit | Example I | Example II | Comparative |
|---|---|---|---|---|
| Mn | kg/mol | 225 | 230 | 223 |
| Mw | kg/mol | 520 | 514 | 533 |
| Mw/Mn |  | 2.31 | 2.23 | 2.39 |
| Mz + 1 | kg/mol | 1250 | 1163 | 1386 |
| ML1 + 4 | MU | 63 | 62.5 | 62 |
| Solution viscosity | mPas | 148 | 160 | 156 |
| Chloride | ppm | not detectable | not measured | 79 |
| Gel particle Ø ≦ 0.5 mm | number range | not measured | <2 | 2-6 |
| Gel particle 0.5 mm ≦ Ø ≦ 1 mm | number range | not measured | 0 | <2 |

Also, FIG. 1 shows the log M plotted against dw/d log M for Example I and the Comparative Example and FIG. 2 shows the log M plotted against dw/d log M for Example II and the Comparative Example. As shown in FIGS. 1 and 2, the polybutadienes of the invention have a surprising and unexpected lower amount of high molecular weight material as compared to conventional polybutadiene of the comparative example. This is also reflected by the lower Mz+1 values. This is advantageous in regard to having less fouling, lower gels, better conversion into HIPS or ABS, and higher yields.

Example III

The coupled interpolymer from example II and the comparison were each used to prepare a modified monovylidene aromatic polymer using styrene and common additives including antioxidant. The resulting polystyrene was converted to a film of 0.120 millimeter thickness using an extruder at 180 to 210° C. The resulting quality of the film was visually assessed regarding the number of gels and their size. The size was calculated assuming the form of a circle using the longest diameter of the gel particle for the calculation. The number of gels was counted in number per kg polystyrene. The number of gels in the modified polymer made with the comparison interpolymer was set to 100. The number of gels in the modified polymer made with the coupled interpolymer of Example II was reported in table 2 as a percent of the corresponding number of gels of the modified polymer made with the comparison interpolymer. As shown in table 2, the number of gels of each size was surprisingly lower for that of modified polymer made with the coupled interpolymer of Example II.

TABLE 2

| Rubber used: | Example II | Comparison |
|---|---|---|
| Number of Gels <0.2 mm$^2$ | 49 | 100 |
| Number of Gels >0.2 mm$^2$ and <0.8 mm$^2$ | 52 | 100 |
| Number of Gels >0.8 mm$^2$ | 58 | 100 |

We claim:

1. A composition comprising a coupled interpolymer comprising one or more monomeric units derived from a diene and coupled using a tetraalkoxysilane coupling agent, wherein the coupled interpolymer is characterized by:
   (A) a halide content of less than about 30 ppm based on the total weight of the coupled interpolymer;
   (B) a molecular weight distribution of from 1.6 to 2.4;
   (C) a vinyl content of from 5 to 15 weight percent based on the total weight of the coupled interpolymer;
   (D) a Mooney viscosity of from 40 to 80, free of the coupled interpolymer, as measured without oil, from 40 to 80;
   (E) an $M_{z+1}$ of from 1000 to 1300 kg/mol measured according to polystyrene standards; and
   (F) a plot of dw/dlogM versus logM having a single peak.

2. The composition of claim 1 wherein the coupled interpolymer comprises coupled polybutadiene.

3. The composition of claim 1 wherein the coupled interpolymer comprises coupled polybutadiene wherein less than about 70 mole percent of the double bonds in the coupled polybutadiene are in the 1,4 cis bonding connected formation.

4. The composition of claim 2 wherein the polybutadiene is characterized by a chloride content of less than about 30 ppm based on the total weight of the polybutadiene.

5. The composition of claim 2 wherein the polybutadiene is characterized by a chloride content of less than about 20 ppm based on the total weight of the polybutadiene.

6. The composition of claim 2 wherein the polybutadiene is characterized by a chloride content of less than about 10 ppm based on the total weight of the polybutadiene.

7. The composition of claim 2 wherein the polybutadiene is characterized by a vinyl content of from 8 to 10 weight percent based on the total weight of the polybutadiene.

8. The composition of claim 2 wherein the polybutadiene is further characterized by a Mooney viscosity of from 45 to 70.

9. The composition of claim 2 wherein the polybutadiene is further characterized by a solution viscosity of the 5% solution in styrene of from 100 to 200 mPas at a temperature of 25° C.

10. The composition of claim 2 wherein the polybutadiene is further characterized by a solution viscosity of the 5% solution in styrene of from 140 to 170 mPas.

11. The composition of claim 2 wherein the polybutadiene is further characterized by an $M_{z+1}$ of from 1040 to 1250 kg/mol measured according to polystyrene standards.

12. A high impact polystyrene composition comprising from about 3 to about 15 weight percent of its total weight of units derived from the coupled interpolymer composition of claim 1.

13. The high impact polystyrene composition of claim 12 further comprising another polymer comprising linear polybutadiene, branched polybutadiene, star branched polybutadiene, high cis-polybutadiene, a block copolymer or a mixture thereof.

14. The composition of claim 1, wherein the coupled interpolymer consists essentially of coupled polybutadiene homopolymer.

15. The composition of claim 1, wherein the coupled interpolymer is a homopolymer or a random copolymer.

16. A process for producing the coupled interpolymer of claim 1, the process comprising:
   polymerizing the one or more monomeric units by continuous anionic solution polymerization in a cyclohexane solvent and in the presence of an initiator to produce an interpolymer comprising a weight average molecular weight of from 270 to 350 kg/mol; and
   coupling the interpolymer with the tetraalkoxysilane coupling agent to produce the coupled interpolymer.

17. The process of claim 16, wherein a ratio of an amount of the tetraalkoxysilane coupling agent to an amount of the initiator is from 0.1 to 0.21 on a molar basis.

18. The process of claim 16, wherein the coupled interpolymer comprises coupled homopolybutadiene.

* * * * *